2 Sheets—Sheet 1.
G. S. CLARK.
SAFETY VAULT.
No. 11,240. Reissued May 24, 1892.
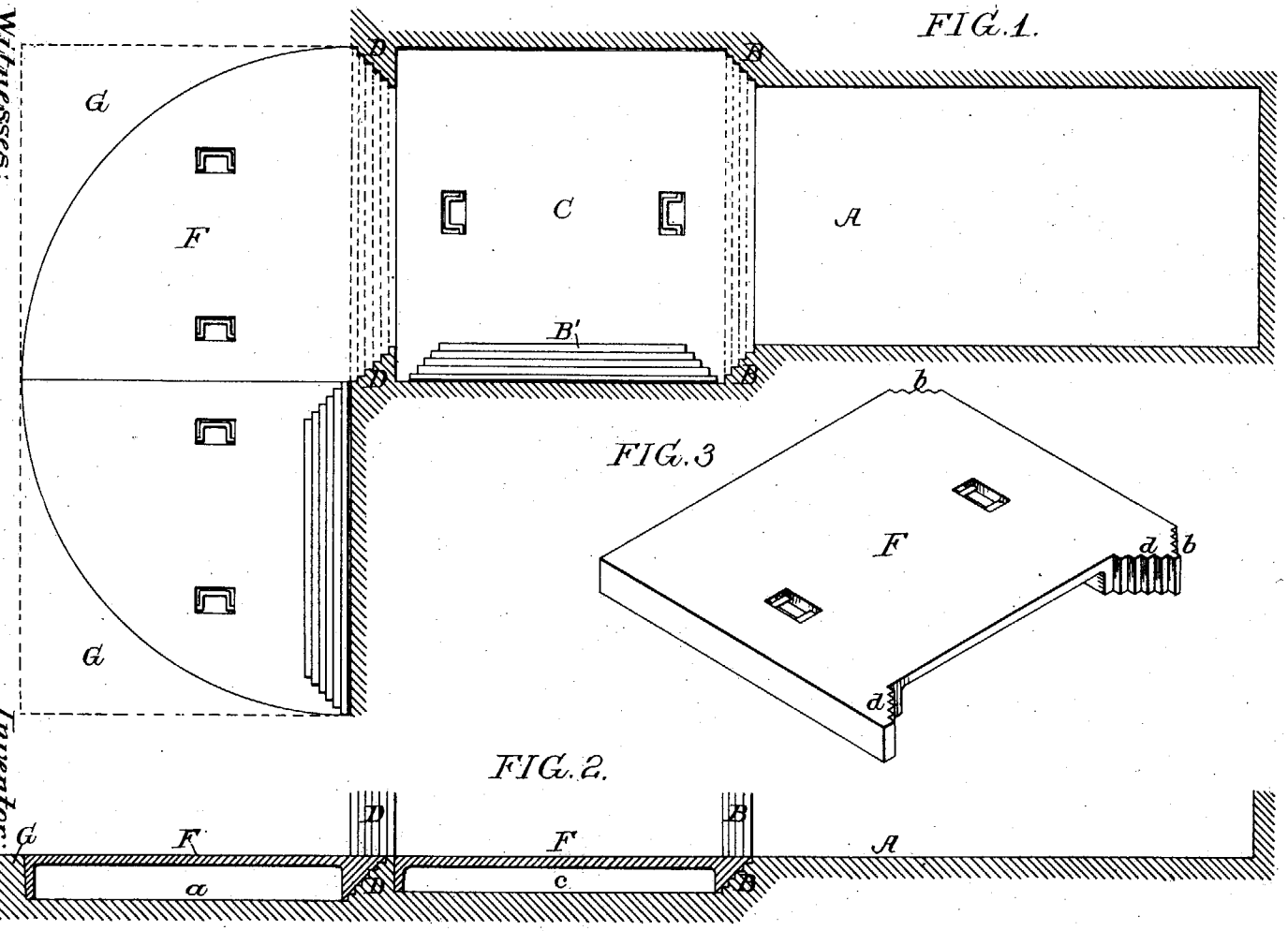
Witnesses:
R. Schlicher
Alex. Barkoff
Inventor:
George S. Clark
by his Attorneys
Howson & Howson
THE NORRIS PETERS CO., PHOTO-LITHO., WASHINGTON, D. C.

G. S. CLARK.
SAFETY VAULT.
No. 11,240. Reissued May 24, 1892.
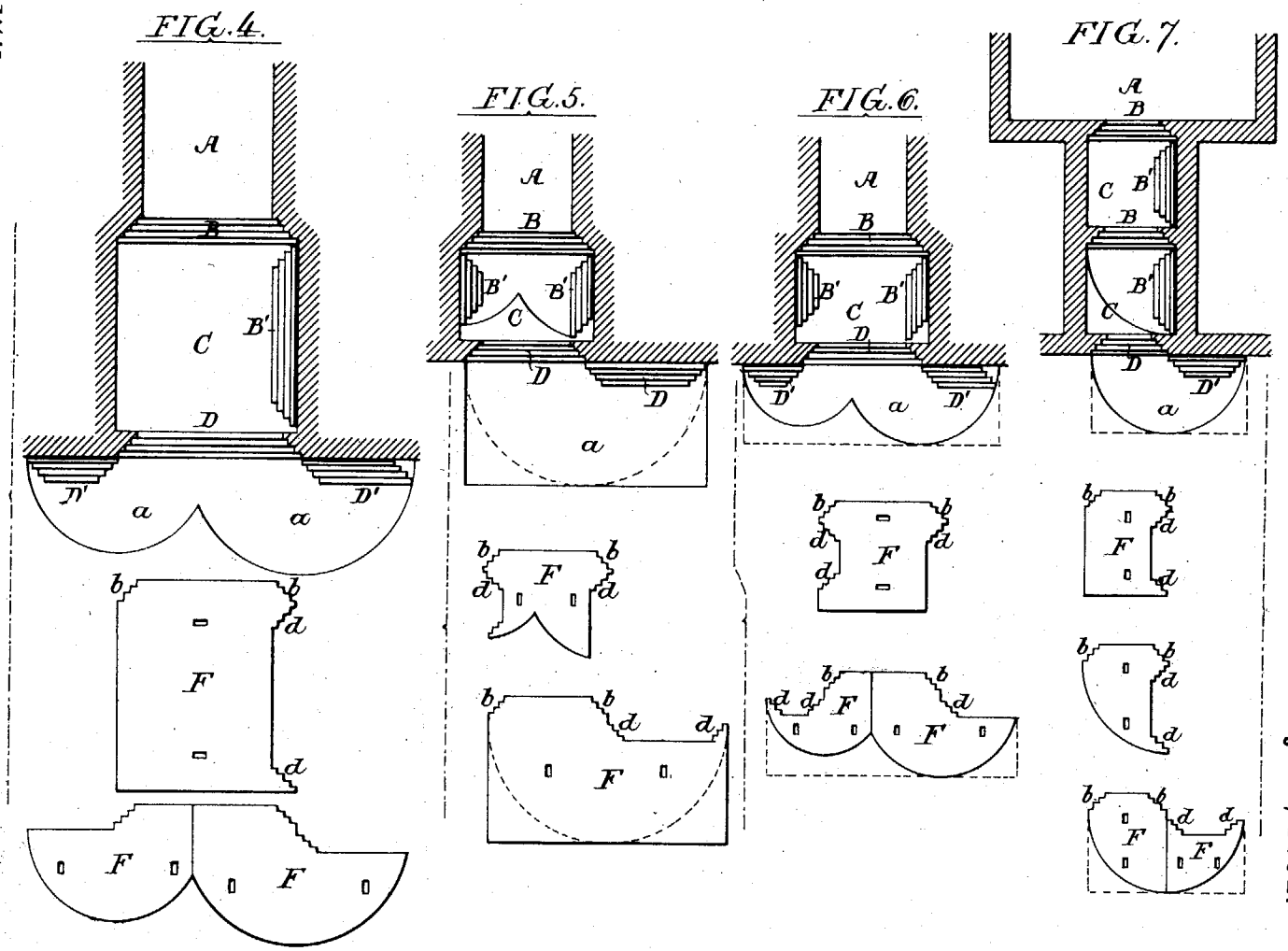
Witnesses:
R. Schleicher.
Alex. Barkoff
Inventor:
George S. Clark
by his Attorneys
Howson & Howson
THE NORRIS PETERS CO., PHOTO-LITHO., WASHINGTON, D. C.

UNITED STATES PATENT OFFICE.

GEORGE S. CLARK, OF PHILADELPHIA, PENNSYLVANIA.

SAFETY-VAULT.

SPECIFICATION forming part of Reissued Letters Patent No. 11,240, dated May 24, 1892.

Original No. 417,904, dated December 24, 1889. Application for reissue filed February 4, 1892. Serial No. 420,347.

*To all whom it may concern:*

Be it known that I, GEORGE S. CLARK, a citizen of the United States, and a resident of Philadelphia, Pennsylvania, have invented certain Improvements in Safety-Vaults and Like Structures, of which the following is a specification.

The object of my invention is to promote the comfort and convenience of and prevent annoyance and injury to persons passing into and from safe-deposit vaults or analogous structures having raised sills or obstructions; and this object I attain in the manner hereinafter set forth, reference being had to the accompanying drawings, in which—

Figure 1 is a sectional plan view of sufficient of a safe-deposit vault or like structure to illustrate my invention. Fig. 2 is a longitudinal section through the doorway of the same and the parts adjacent thereto, illustrating my invention. Fig. 3 is a perspective view of one form of device used by me in the carrying out of my invention; and Figs. 4 to 7 are views similar to Fig. 1, but illustrating slight modifications of the invention and showing detached the parts of the structures to which my invention relates.

The fire and burglar proof vaults of modern banks, trust, and safe-deposit companies are always provided with doors and doorways having rabbeted joints, so that part of the door-frame presents a raised sill which is a source of constant annoyancce and frequent injury to persons passing in or out of the safe or vault, owing to their liability to trip and stumble by catching the feet on the raised sill of the doorway, this being especially the case in the vaults of large safe-deposit companies where there are many safe-renters and consequently much travel into and from the vault. These latter vaults, moreover, are usually provided with both inner and outer doors and with one or more intervening vestibules, and hence the objection is very materially aggravated, as persons entering the vault have first to step over the sill of the outer doorway and down into the vestibule and have then to step over the sill or sills of the inner doorway or doorways in order to enter the vault.

In the accompanying drawings, A represents part of a vault; B, the inner doorway of the same; C, the vestibule, and D the outer doorway, the door B′ for closing the inner doorway B swinging open into the vestibule C, and the door D′, which closes the outer doorway, swinging in a semicircular pit *a* in the floor G of the apartment with which the vault communicates. This pit *a* may, however, be square, as by dotted lines in Fig. 1, or of other angular form, if desired, as may also the other segmental pits referred to hereinafter.

In applying my invention to such a vault I provide both the pit *a* and the vestibule C with a movable floor F, of such a height as to be flush with the tops of the sills of the inner and outer doorways, as shown in Fig. 2, so that a passage-way having a bottom flush with the bottom of the vault and with the tops of the sills extends from said vault to the floor G of the outer room or apartment, and ingress to or egress from the vault is not interfered with by the sills of either of the doorways. These movable floors or filling-pieces may be made of wood, metal, or other material, and each may be in one piece or in as many sections as desired, the structures being preferably provided with sunken grips or handles or other equivalent means, whereby they may be readily adjusted to or removed from their proper position or carried about from place to place. Each of the movable floors or filling-pieces is also by preference so shaped as to fit snugly to the rabbeted faces of the open door, as well as to the rabbeted edges of the doorway, as will be understood on reference to Fig. 3 of the drawings, which represents the movable floor or filling-piece F for the vestibule C, the notched corners *b b* of this filling-piece fitting to the rabbeted edges of the inner doorway B, while the notched corners *d d* fit snugly to the rabbeted face of the door B′ when the latter is closed back against the side of the vestibule.

In Fig. 4 of the drawings I have shown a vault having an inner doorway with single door and an outer doorway closed by double doors, the floor G of the outer room or apartment having two semicircular pits, one for each door, and in Fig. 5 I have shown a vault having a single outer door and double inner doors swinging in segmental pits in the floor of the vestibule, while in Fig. 6 I have shown a vault having double doors for both the inner and outer doorways, and in Fig. 7 I have shown a vault having two vestibules, the movable floors being illustrated separately in each of these cases. Hence it will be understood that the movable floors or filling-pieces constituting the subject of my invention may be varied in shape, as desired, to suit the varying conditions of their use.

The obstruction might be of some other nature than the raised sill of the door—part of the locking mechanism, for instance—the movable floor in all cases being adapted to overcome the peculiar form of obstruction.

Having thus described my invention, I claim and desire to secure by Letters Patent—

1. The combination of a vault or analogous structure having a floor level with the floor of the apartment with which it communicates, a raised sill or obstruction between the vault-floor and the floor of the apartment, and a depression beyond said sill, with a movable floor or filling-piece covering said depression and fitting to said sill or obstruction, substantially as specified.

2. The combination of a vault or analogous structure having a raised sill or obstruction and a sunken door-pit beyond the same, with a movable floor or filling-piece covering said pit and fitting snugly to the sill or obstruction and to the open door, substantially as specified.

3. The combination of a vault or analogous structure having its floor level with the floor of the apartment with which it communicates, inner and outer doorways with raised sills or obstructions, and one or more intervening vestibules, with a movable floor or filling-piece extending from the inner to the outer sill or obstruction, whereby the floor of the vestibule is flush with that of the vault, substantially as specified.

4. The combination of a vault or analogous structure having its floor level with the floor of the apartment with which it communicates, inner and outer doorways with raised sills or obstructions, one or more intervening vestibules, and a door-pit beyond the outer sill or obstruction, with movable floors or filling-pieces applied to said door-pit and vestibule or vestibules and forming a flush passage-way into and out of the vault, substantially as specified.

In witness whereof I have hereunto set my hand and in the presence of two subscribing witnesses.

GEORGE S. CLARK.

Witnesses:
JNO. E. PARKER.
HARRY SMITH.